March 29, 1966  KAZUO MOMOI  3,242,699

FISHING NET

Filed July 29, 1963  2 Sheets-Sheet 1

Kazuo Momoi
INVENTOR.

BY George B. Oujevolk
Attorney

3,242,699
FISHING NET
Kazuo Momoi, 760 Nakahiro, Ako-shi, Hyogo-ken, Japan
Filed July 29, 1963, Ser. No. 298,358
1 Claim. (Cl. 66—193)

The present invention relates to fishing nets and relates more particularly to the structure of so-called knotless fishing nets wherein the warp chains are formed by interengaging a plurality of yarn components, and connected together at spaced junction points.

Heretofore, knotless nets of the above type have been advantageously employed in the fishing industry as nets of high safety owing to their higher intensity and durability than those of ordinary fishing nets. Such knotless net is characterized by the fact that the construction of the legs and the junction points thereof can be relatively optionally varied by merely changing the proportion of the yarn components. On the other hand, however, knotless nets of the prior type are subject to a serious difficulty in that since the chains of the net are formed of a plurality of endless yarn components or the like, the breaking of one of the component elements will progressively destroy the whole formation of the net. Moreover, nets of this type are generally of a very complicated formation, so that their water resistance is naturally increased, thus resulting in a lowering of the net efficiency.

Accordingly, the principal object of this invention is to eliminate the above mentioned difficulties.

A further object of this invention is to provide a knotless fishing net which is of a minimized water resistance and of higher tensile strength and durability, and in which the yarn components are interconnected with a reduced friction between the components, in such a manner as to produce a fishing net of a relatively simple construction and to form junction points smaller with respect to the legs of the net.

Other objects and advantages will become apparent from the description hereinafter set forth and the appended claim, reference being had to the accompanying drawing, in which:

Figure 1:
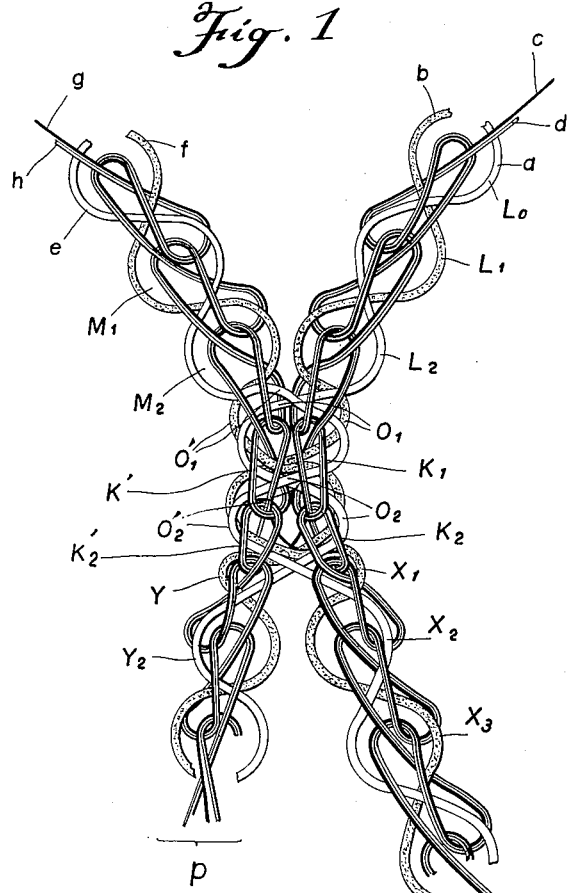
FIG. 1 is a plan view of this invention, illustrating two warp chains with the junction point connecting said chains.
Figure 2:
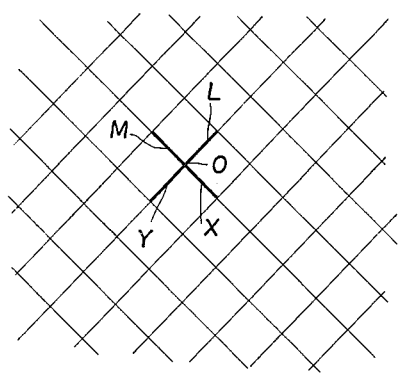
FIG. 2 is a plan view showing a section of mesh of this invention.
Figure 1A:
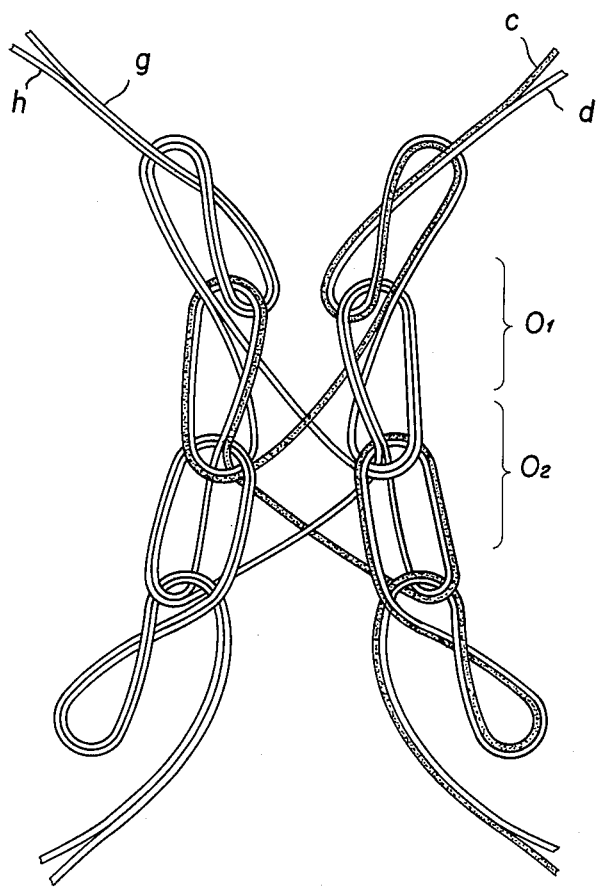
FIG. 1a is an amplified view of a portion of FIG. 1.

Referring now to the accompanying drawing, the net generally consists of a plurality of warp chains which are joined together at spaced junction points generally indicated by the reference character O in FIG. 2. L and X in FIG. 2 designate the legs of the right-hand warp chain Q, and M and Y the legs of the left-hand warp chain P. These portions L, X, M and Y shown in lines wider than the rest of FIG. 2 are shown extremely enlarged in FIG. 1 for better illustration of the structure of the net. It should be understood that the word "leg" or "legs" in this specification is intended to mean the portion of warp chain which lies between two adjacent junction points. It should also be understood that each component element of the chains will be hereinafter described independently with respect to other component elements, but that corresponding elements will be simultaneously formed in the knitting operation of the net.

Referring to FIG. 1 of the drawing, it will be seen that each chain, insofar as the legs of the meshes are concerned, is formed of four yarn components two of which constitute the basic pattern thereof. Reinforcing yarns are indicated by $a$, $b$, $e$ and $f$, respectively. The yarns $b$ and $f$ are shown stippled in the drawing to clearly distinguish them from yarns $a$ and $e$. The yarns $a$ and $b$ are first formed into successive link portions by merely being crossed with each other so as to form the pattern of the leg L of the right-hand chain Q, said link portions being indicated by $L_1$ and $L_2$. While at the same time, this operation is also followed by yarns $e$ and $f$, which form link portions $M_1$ and $M_2$ of the leg M of the left-hand warp chain P. Reaching the junction point, yarns $a$ and $b$ are formed into two successive link portions indicated by $O_1$ and $O_2$, while yarns $e$ and $f$ are formed into two successive link portions indicated by $O_1'$ and $O_2'$. It will be apparent from the drawing that those link portions $O_1$ and $O_2$ and the portions $O_1'$ and $O_2'$ are duplicated or doubled to form the pattern of the junction point generally shown at O. Thereafter, one of the yarns, i.e. the yarn $a$, is traversed to the opposite side of the chain Q and with the yarn $f$, forms a portion Y and successive link portions $Y_2 \ldots$ till the next junction point (not shown) is reached. While yarn $b$ of the right-hand chain Q and yarn $e$ of the leg M form a portion indicated by $X_1$ and successive link portions $X_2$, $X_3 \ldots$ till they reach the next junction point (not shown), in a similar manner as the pattern of the leg L or M has been formed. It should be noted that at the junction point O each pair of the yarns $a$, $b$ and $e$, $f$, forming the link portions $O_1$, $O_2$ and $O_1'$, $O_2'$ are not merely doubled, but alternately piled in such a manner that their order will be, from the position looking down the drawing, yarn $e$, $a$, $f$ and $b$.

The reference character $c$ indicates a main yarn forming one of the series of the warp chain Q and adapted to cooperate with the reinforcing yarns, or, in other words, to put them in position, in cooperation with the associated yarn $d$. As clearly seen upon inspection of the drawing, these main yarns $c$ and $d$, insofar as the legs of the meshes are concerned, run together without being twisted with each other. Said yarns $c$ and $d$ first pass forwardly through the portion $L_0$ of the right-hand warp chain Q and interknit with the following link portion indicated by $L_1$ or the following stitch, and then pass again backwardly from the link portion $L_1$ to the preceding portion $L_0$ at which they interknit with themselves. The yarns $c$ and $d$ then merely pass through the link portion $L_1$, but interknit with the following link portion $L_2$. It should be understood that though only two link portions are seen at the leg L in the drawing, such portions may be varied in number depending upon the length of the leg desired. In general, the above operations are repeated until the adjacent junction point is reached, thus forming one side of the mesh. It will be readily seen from the drawing that while these operations are being performed, substantially the same operations are followed by yarns $g$ and $h$ of the warp chain P, said yarns $g$ and $h$ corresponding with those indicated by $c$ and $d$ in the right-hand warp chain.

At the junction point, the reinforcing yarns $c$ and $d$ as a pair, pass forwardly through the link portion $L_2$ of the right-hand chain Q and interknit with the doubled link portions $O_1$ and $O_1'$, and thereafter again pass back to the preceding link portion $L_2$ so as to interknit with themselves. In the next operation, yarns $c$ and $d$ pass forwardly through the doubled link portions $O_1$ and $O_1'$ to the doubled link portions $O_2$ and $O_2'$, at which the relationship between them of being a pair is temporarily changed. That is, the yarn $c$ of the right-hand warp chain Q is separated from its paired yarn $d$, and runs transversely to cooperate with yarn $h$ of the left-hand warp chain P, while said yarn $d$ is paired with the yarn $g$ at portion where the yarn $c$ is separated therefrom. These yarns $d$ and $g$ form a loop which interknits with both the doubled link portions $O_1$, $O_1'$ and $O_2$, $O_2'$, and also with the yarns of the same series at the preceding doubled link portions $O_1$ and $O_1'$. The yarns $d$ and $g$ are then advanced to the following doubled link portions $O_2$ and $O_2'$ at which said yarn $g$ is separated from the yarn $d$, and traversed to be paired with the yarn $h$ of the left-hand chain. On the other hand, the yarn $d$ is again paired with the yarn $c$ traversed from the left-hand chain in a similar manner as the yarn $g$. Such paired yarns are formed into a loop which interknits with the preceding loop. These yarns are then formed in a similar manner as the same have been formed at the link portions $L_1$ and $L_2$ of the leg L. Also these same operations are applied to the yarn $g$ and $h$ of the chain P.

As is apparent from the drawing, the paired yarns $c$ and $d$ knit with themselves at every link portion, while interknitting with yarns $a$ and $b$. Similarly the yarns $g$ and $h$ knit with themselves at every link portion while interknitting with the basic yarns $e$ and $f$.

From the above description it will be seen that the fishing net of this invention is produced by forming each of the yarns $a$, $b$ and $e$, $f$, into a plurality of link portions which constitute the patterns for the legs L, M, Y and X and the junction point O, and the desired objective achieved by the cooperation of yarns $c$, $d$, and $g$, $h$. Therefore, the structure of the net being simple, friction between the engaged portions of the yarn components may be far reduced when compared with that in fishing nets of prior types which are often subject to a loss at an early stage, raveling or breaks, due to its complicated structure.

Another feature of the net of this invention is its minimized resistance to water. Since the juncture point of the chains is formed by duplicating or doubling the link portions of the different chain, the resultant juncture point will be not only of high tensile strength, but also of a smaller size in contrast to the legs of the meshes.

The most important characteristic of the net of this invention resides in the structure of the junction point in that it has a high resistance against tensile stress applied to a transverse direction with respect thereto. The knot or junction point of a prior fishing net is commonly said to be structurally weak especially when transverse tensile stress is applied thereon. According to this invention, however, the employment of the adjacent doubled link portions $O_1$, $O_1'$ and $O_2$, $O_2'$ of the basic yarns, and the reinforcing yarns which interknit with said link portions so as to reinforce or put them in position, makes the junction point tight and sufficiently strong to provide a high resistance against transverse tensile stress. Moreover, since one of the yarns of the respective chains is at the junction point passed to the opposite chain, even if parts of the yarns $c$, $d$ are broken, the chains Q and P will not be separated from each other, but will still keep the basic pattern of the net.

In the embodiment described herein and illustrated in the accompanying drawing, each of the yarns $c$ and $g$ interknits only once with the doubled link portions of the junction point at its other side. However, in order to reinforce the junction point more tightly, the yarn $c$ may be transversed at the junction point from the right-hand series of the reinforcing yarns $c$ and $d$ to the other side and formed into the loop $K_1'$ together with the yarn $h$ of the left-hand chain, and thereafter again passed to its original series as it is advanced one stitch. On the other hand, the yarn $d$ may also be transversed from the right-hand series of the reinforcing yarns $c$ and $d$ to the other side and formed into the loop $K_2'$ together with the yarn $g$, and thereafter returned to its original series as it advances one stitch. Similarly the yarns $g$ and $h$ are formed in the same manner as the yarns $c$ and $d$.

Furthermore, it is also possible that, in the junction point, both the yarns $c$ and $d$ of the right-hand chain may be passed together to the other side of the series to solely form the loop $K_1'$, and thereafter they may be again traversed to the right. In this case, the loop indicated by $K_1$ may be solely formed of a pair of the yarns $g$ and $h$ of the left-hand chain.

The reinforcing yarns may, of course, be varied in number as needed, the size of said yarns being advantageously selected depending upon that of the basic yarns. It is obvious that any suitable material or materials may be employed in the forming of the net. The edges of the net may be bound in the usual manner and for this reason such binding operation is not herein illustrated.

Various changes may be made in the details of the structure as described without departing from the spirit and scope of this invention or sacrificing any of the advantages thereof.

What is claimed is:

A fishing net comprising in combination:
at least two chains, each chain having a primary pattern of crossed first and second yarns disposed to form a succession of links;
third and fourth paired yarns disposed side by side, shaped into a plurality of loops interknit with said links;
junctions between said chains having double first and second yarns thereat from each of said chains;
a pair separation at said junction of the third and fourth yarns of each chain, the third yarn of the one chain being then paired with the fourth yarn on the other chain while the fourth yarn of the one chain is paired with the third yarn of the other chain; and,
a succession of such junctions between said chains.

References Cited by the Examiner
UNITED STATES PATENTS

| | | | |
|---|---|---|---|
| 2,992,550 | 7/1921 | Frith | 66—195 |
| 3,118,294 | 1/1964 | Van Laethem | 66—193 |

DONALD W. PARKER, *Primary Examiner.*

RUSSELL C. MADER, P. FAW, *Assistant Examiners.*